Patented Dec. 26, 1944

2,365,915

UNITED STATES PATENT OFFICE

2,365,915

EMULSIFYING AGENT AND PROCESS FOR MAKING SAME

James Earl Taylor, Louisville, Ky., assignor to The Procter and Gamble Company, Ivorydale, Ohio, a corporation of Ohio No Drawing. Application August 26, 1942, Serial No. 456,275

3 Claims. (Cl. 260—397.2)

This invention relates to an improved emulsifying agent and to a process for making same.

The process employs lanolin, i. e. purified wool fat, as a basic raw material, and includes the steps of saponifying the esters present in lanolin with litharge to form lead soaps and to liberate sterols, hydrogenating this mixture at high temperature and pressure to convert the fatty acids of the lead soaps to the corresponding fatty alcohols, and freeing the hydrogenated product from metallic lead. The resulting product, which may be further purified if desired, consists largely of cholesterol and fatty alcohols, and possesses excellent emulsifying properties which are superior to those of the original lanolin.

In application Serial No. 380,072, filed February 21, 1941, by Richardson and Taylor, now Patent No. 2,340,343, a process is described and claimed which comprises, among other things, the conversion of fatty acids to the corresponding fatty alcohols (i. e. the reduction of the

of the carboxylic group to

by subjecting lead salts of these fatty acids to contact with hydrogen at high temperature and pressure. My present invention subjects selected raw materials to the general process disclosed in that application in a manner such that a new and valuable product results.

As a specific example of one way in which my invention may be practiced, I first mix 21 parts of finely divided litharge with about 100 to 120 parts of melted lanolin, having a saponification value of 105, heat and agitate the mixture by blowing steam through it for several hours, or until the yellow color of the litharge has substantially disappeared, thus forming lead soaps of fatty acids of the esters present in the lanolin. The resulting mixture, which includes lead soaps and unsaponifiable matter, i. e., the sterols set free by the saponification, is dried and is then placed in a strong stainless steel hydrogenation vessel in which an atmosphere of hydrogen is maintained. A hydrogen pressure of about 2000 pounds per square inch is built up in this vessel, the temperature of the reaction mixture is then raised to about 340° C. and the hydrogen pressure is increased to about 4000 pounds per square inch, and the contents of the vessel are agitated to bring the hydrogen into intimate contact with the lanolin-lead soap mixture which is molten under these conditions. These conditions are maintained for about one to three hours, after which the reaction mixture is cooled to about 150° F. or lower, the hydrogen pressure is relieved, and the liquid reaction products are removed from the vessel, boiled with a dilute solution of hydrochloric acid, or otherwise treated to remove free and combined lead, and washed or heated until free of mineral acid. The product may then be filtered and dried if desired.

The resulting product, which contains cholesterol and other sterols, and alcohols corresponding to the fatty acids of the sterol esters of the original lanolin, is an excellent emulsifying agent and as such is especially useful in the preparation of cosmetic creams and ointments.

The conditions of temperature, pressure, time, etc., which are suitable for the practice of my invention are not limited to those mentioned in the foregoing example, as it is to be understood that the general conditions described in application Serial No. 380,072 are applicable to the instant process.

Preferred conditions for this process include maintenance of a temperature between about 240° C. and about 400° C. and a pressure in excess of 2000 pounds per square inch. The alcohol forming reaction occurs, although more slowly, at temperatures below 240° C., down to 180° C. at least. Likewise this reaction has been observed under suitable temperature conditions at pressures as low as 500 pounds per square inch. The time required for the reaction is usually relatively short. In many cases when temperature and pressure are within the preferred ranges approximate equilibrium is reached within two or three hours, and sometimes the reaction goes substantially to completion within as short a time as five minutes after reaching the preferred temperature. Continuation of the elevated reaction temperature and pressure and continued contact with hydrogen for several hours after completion of the alcohol-forming reaction have not been found to influence the yields of the desired products to any appreciable extent.

An improved form of my product, possessing greatly increased resistance to oxidation, may be made by hydrogenating the above described product of my process at relatively low temperature and pressure, with the aid of a hydrogenation catalyst such as finely divided nickel, in such a manner as to saturate olefinic double bonds according to well known practice. The product thus produced is a mixture of fatty alcohols and sterols corresponding to the fatty acids and sterols of lanolin, except that these product components are less unsaturated and hence the product has a lower iodine value and a firmer consistency at any temperature below the complete melting point.

Having thus described my invention, what I claim and desire to secure by Letters Patent is:

1. An emulsifying agent comprising a mixture of sterols derived from lanolin and alcohols corresponding to fatty acids of the esters of lanolin.

2. An emulsifying agent comprising a hydrogenated mixture, substantially free from olefinic double bonds, of sterols derived from lanolin and alcohols corresponding (except as to saturation of olefinic double bonds) to fatty acids of the esters of lanolin, said agent being formed by catalytic hydrogenation, at relatively low temperature and pressure, of the composition of claim 1.

3. A process of preparing an emulsifying agent, which comprises reacting litharge with the esters of lanolin to form lead soaps of the ester fatty acids and to liberate sterols, and subjecting the resulting mixture, to reaction with hydrogen at elevated temperature and pressure to convert said fatty acids substantially to the corresponding alcohols.

JAMES EARL TAYLOR.